(12) United States Patent
Lazaridis et al.

(10) Patent No.: US 7,664,515 B2
(45) Date of Patent: Feb. 16, 2010

(54) ADVANCED USER INTERFACE OPERATIONS IN A DUAL-MODE WIRELESS DEVICE

(75) Inventors: Mihal Lazaridis, Waterloo (CA); Gary P. Mousseau, Waterloo (CA)

(73) Assignee: Research In Motion Limited, Waterloo (CA)

( * ) Notice: Subject to any disclaimer, the term of this patent is extended or adjusted under 35 U.S.C. 154(b) by 234 days.

(21) Appl. No.: 10/497,803

(22) PCT Filed: Dec. 6, 2002

(86) PCT No.: PCT/CA02/01946

§ 371 (c)(1),
(2), (4) Date: Jun. 3, 2004

(87) PCT Pub. No.: WO03/049460

PCT Pub. Date: Jun. 12, 2003

(65) Prior Publication Data

US 2005/0020286 A1    Jan. 27, 2005

Related U.S. Application Data

(60) Provisional application No. 60/336,705, filed on Dec. 7, 2001.

(51) Int. Cl.
*H04W 4/00* (2009.01)
(52) U.S. Cl. ............... 455/466; 455/435.2; 455/448
(58) Field of Classification Search ............ 455/466, 455/566

See application file for complete search history.

(56) References Cited

U.S. PATENT DOCUMENTS

| | | | |
|---|---|---|---|
| 5,613,213 A * | 3/1997 | Naddell et al. | ........... 455/435.2 |
| 5,722,088 A | 2/1998 | Storn et al. | |
| 5,915,214 A | 6/1999 | Reece et al. | |
| 5,940,773 A | 8/1999 | Barvesten | |
| 6,119,021 A | 9/2000 | Katz | |
| 6,266,543 B1 | 7/2001 | Chen | |
| 6,463,292 B1 * | 10/2002 | Rahman | ............... 455/466 |
| 6,466,783 B2 * | 10/2002 | Dahm et al. | ............ 455/414.2 |
| 6,741,843 B1 * | 5/2004 | Kalliokulju et al. | ...... 455/226.1 |
| 6,922,721 B1 * | 7/2005 | Minborg et al. | ............ 709/219 |

FOREIGN PATENT DOCUMENTS

| | | |
|---|---|---|
| EP | 0 344 989 A | 12/1989 |
| EP | 0 435 052 A2 | 7/1991 |
| EP | 0 614 303 A | 9/1994 |
| EP | 1 239 650 A | 9/2002 |
| WO | WO 01 63946 A | 8/2001 |

OTHER PUBLICATIONS

Fasbender A et al, "Any Network, Any Terminal, Anywhere" IEEE Personal Communications, IEEE Communications Society, US, vol. 6, No. 2, Apr. 1999, pp. 22-30.

* cited by examiner

*Primary Examiner*—Erika A Gary
(74) *Attorney, Agent, or Firm*—Jones Day; Krishna K. Pathiyal; Robert C. Liang

(57) ABSTRACT

A system and method are provided for mobile stations for enhancing the ease of use of a mobile station. Through the system and method, a user may more easily view the phone number of a caller identification card. The user may be alerted when the user tries to send messages while out of GPRS coverage, or the mobile station may recognize extension numbers in address book user interface applications to assist with a dialing operation.

9 Claims, 16 Drawing Sheets

ADVANCED USER INTERFACE OPERATIONS IN A DUAL-MODE WIRELESS DEVICE

CROSS-REFERENCE TO RELATED APPLICATION

This application claims priority to U.S. provisional application Ser. No. 60/336,705 (entitled "ADVANCED USER INTERFACE OPERATIONS IN A DUAL-MODE WIRELESS DEVICE" filed Dec. 7, 2001). By this reference, the full disclosure, including the drawings, of U.S. provisional application Ser. No. 60/336,705 is incorporated herein.

BACKGROUND

1. Technical Field

The present invention relates generally to mobile communication devices or stations and more particularly to user interface applications for dual-mode communication mobile devices or stations.

2. Description of the Related Art

While the functionality of handheld mobile stations has increased, so has the difficulty in using them. For example, current handheld mobile stations do not provide an easy way for a user to display the phone number that is assigned to the station via a subscriber identity module (SIM) card. To perform the required display steps may take too long and be awkward for the user to remember. Because the user may have to access several menus to find the phone number, the user also might not be able to access the phone number during a call.

Difficulties also arise when handheld mobile stations are in coverage zones of limited messaging capability. For example, stations do not adjust their behaviour for sending messages while in zones of limited messaging capability, such as by alerting a user to the limited network capability or to other methods of sending messages while in such zones. Additional difficulties arise when a user is manipulating interfaces associated with a mobile station's address book. Current address book user interfaces on mobile stations do not recognize special characters such as extension numbers when dialing. A typical station will dial a phone number in an address book and not recognize any further numbers after the main phone number. If the user is prompted by an automated operator for an extension number, often the user must re-open the address book application and find the associated extension number to input manually.

SUMMARY

In accordance with the teachings disclosed herein, a system and method are provided that enhance the ease of use of a mobile station. For example, a system and method are provided that allow a user to view the phone number of the dual-mode station by reading a caller identification module card, and displaying a phone number on the main screen of the station's LCD. As another example, the mobile station alerts a user when the user tries to send messages while within a network of limited text messaging capability. The mobile station notifies the user of the network's capability and/or other methods of sending messages while out of coverage. As yet another example, the mobile station recognizes extension numbers in address book user interface applications. When a phone number with an associated extension number is dialed, the mobile station allows for automatically dialling the extension number. Further features of the invention will be described or will become apparent in the course of the following detailed description.

BRIEF DESCRIPTION OF THE DRAWINGS

In order that the invention may be more clearly understood, the one or more embodiments thereof will now be described in detail by way of example, with reference to the accompanying drawings, in which.

DETAILED DESCRIPTION

Figure 1:
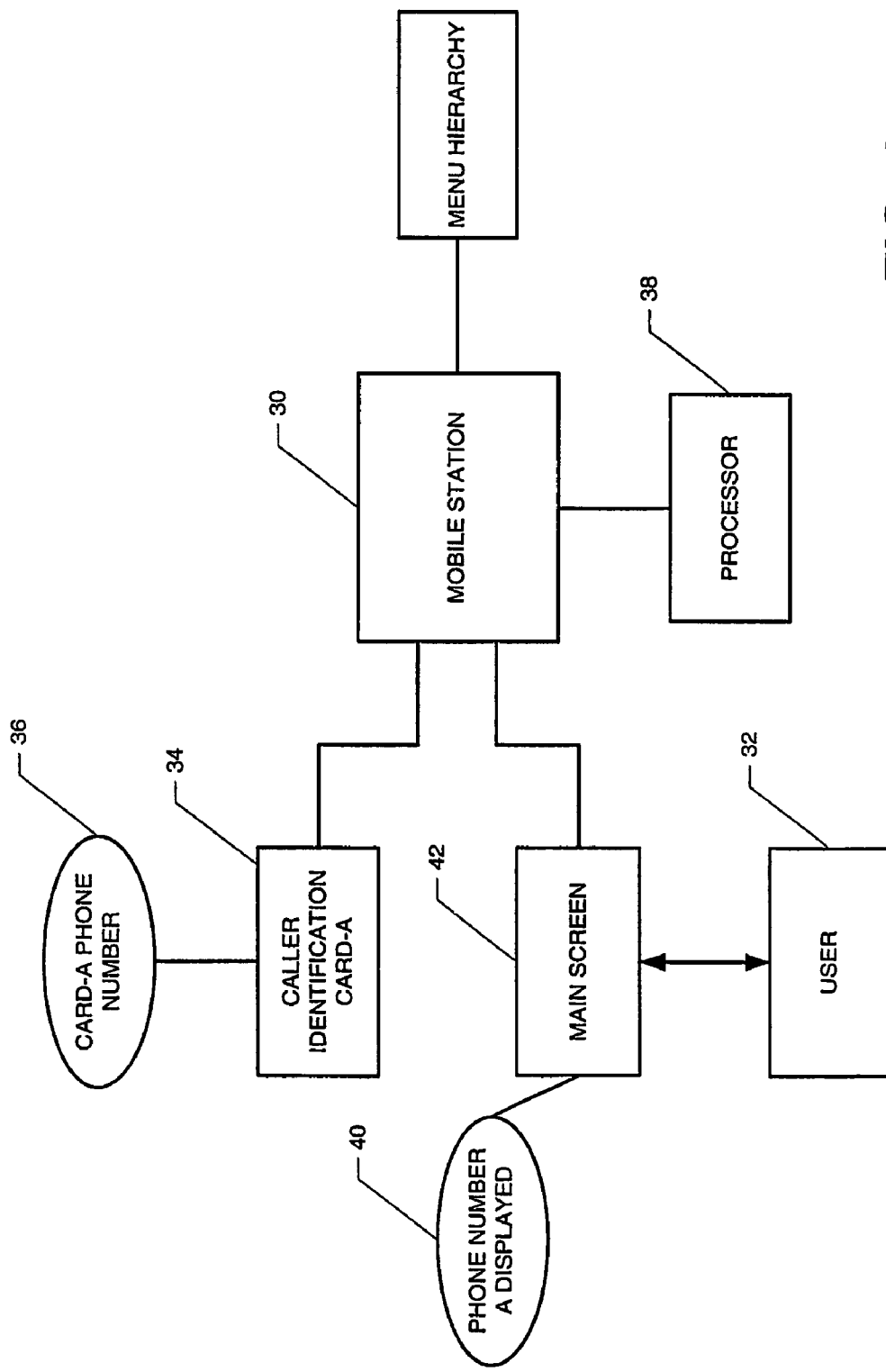
FIG. 1 is a block diagram depicting a mobile station configured to display one or more phone numbers associated with a caller identification card.

FIG. 1 depicts a dual-mode mobile station 30 that is capable of both voice and data communications. The station's user 32 can insert and remove caller identification module cards (such as subscriber identity module cards) from the station 30 so that other stations may contact the mobile station 30. To allow other stations to contact it, the caller identification module card 34 is associated with at least one phone number 36. The station 30 contains a processor 38 which is configurable through machine instructions to allow the phone number 36 to be displayed on the main screen 42 of the station 30.

Through display of the phone number 36 on a main or primary screen 42, the user 32 does not have to course through a station's menu hierarchy 44 or learn multiple key sequences to access the card's phone number. Display on a main screen 42 (as indicated at 40) allows a much easier way for a user 32 to view the phone number 36 on the card 34. This is especially helpful if the user 32 needs to view the number quickly, for example, if the user 32 is on a phone call and needs to provide the number 36 from the card 34.

It is noted that if there is a menu or screen hierarchy 44 on the station 30, then a main screen 42 will typically occupy the top of the hierarchy or it may be the screen that is primarily displayed to the user 32. Also, a main screen 42 may include the screen that is present by default while a phone conversation or phone operation takes place. Furthermore, the notification might be a display shown to the user on several key screens, such the primary screen and/or the messaging screen, and/or the phone application's main screen(s).

Figure 2:
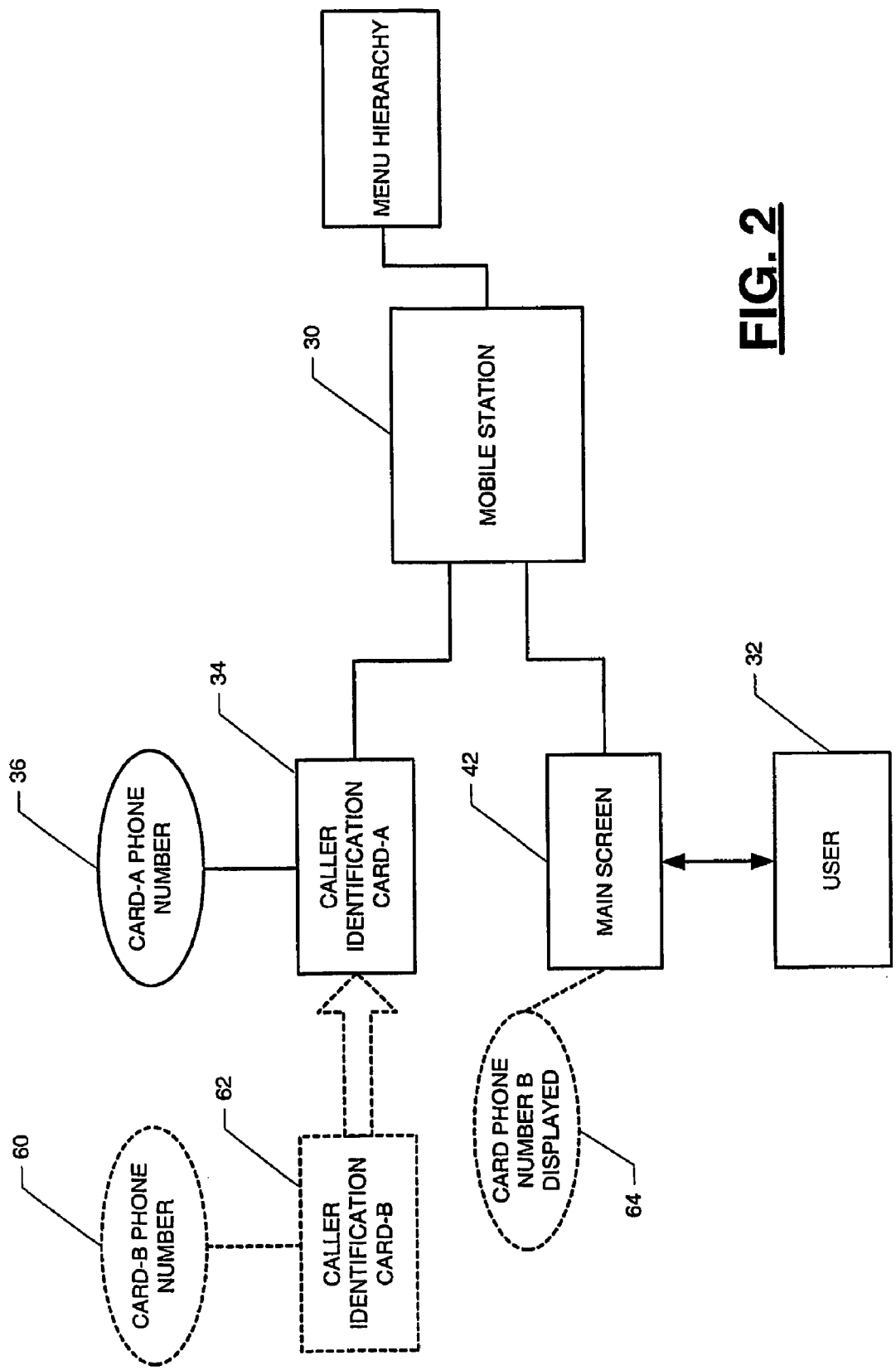
FIGS. 2 and 3 are block diagrams depicting use of different caller identification cards and networks with a mobile station.

The system may be varied in many ways. For example if the user 32 changes cards as shown in FIG. 2, then the phone number 60 of the new card 62 is displayed (as indicated at 64) on the main screen 42. A card coupling mechanism as is typically used with mobile stations is provided to allow a card to be added (e.g., inserted into or attached thereto) and removed from the station 30. The system is adaptable to many different mobile stations that are capable of handling SIM cards and their functional and operational equivalents. The system may also display on the main screen or window 42 other identification information associated with the card, such as the user's e-mail address from the card. The mobile station may also connect to larger networks using wireless short range or LAN-based networks, such as a network complying to the 802.11 standard.

Figure 3:
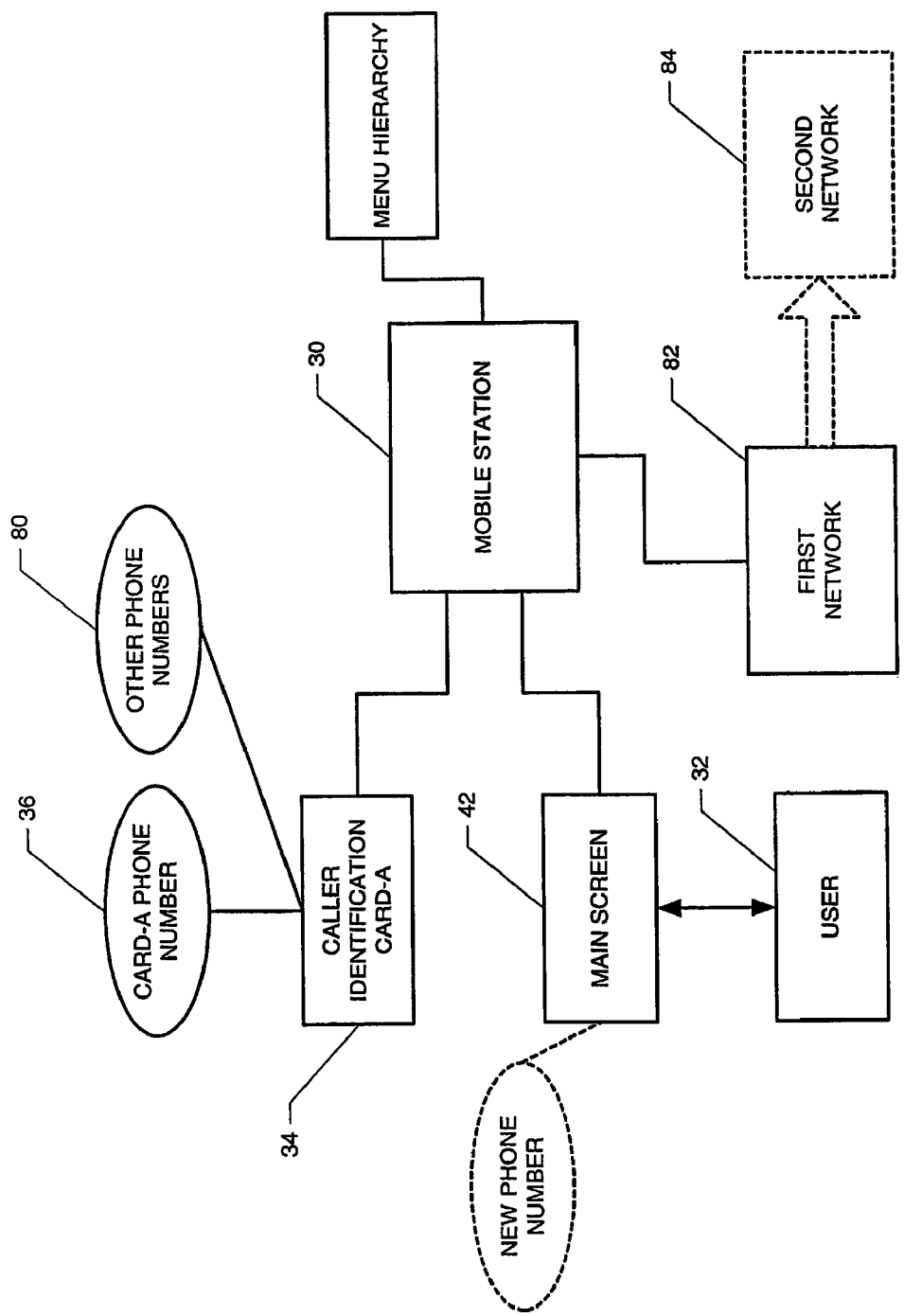

FIG. 3 provides another example of the flexibility of the system wherein the phone number on the main screen 42 is changed if the user 32 changes networks. A card 36 may have multiple identities or phone numbers 80 depending on networks or countries within which the user roams. Accordingly, if the user goes from one network 82 to another network 84 due to travelling from one place to another, then a different phone number from the card may be used. As indicated at 86, the main screen 42 is updated to reflect the changed phone number.

Figure 4:
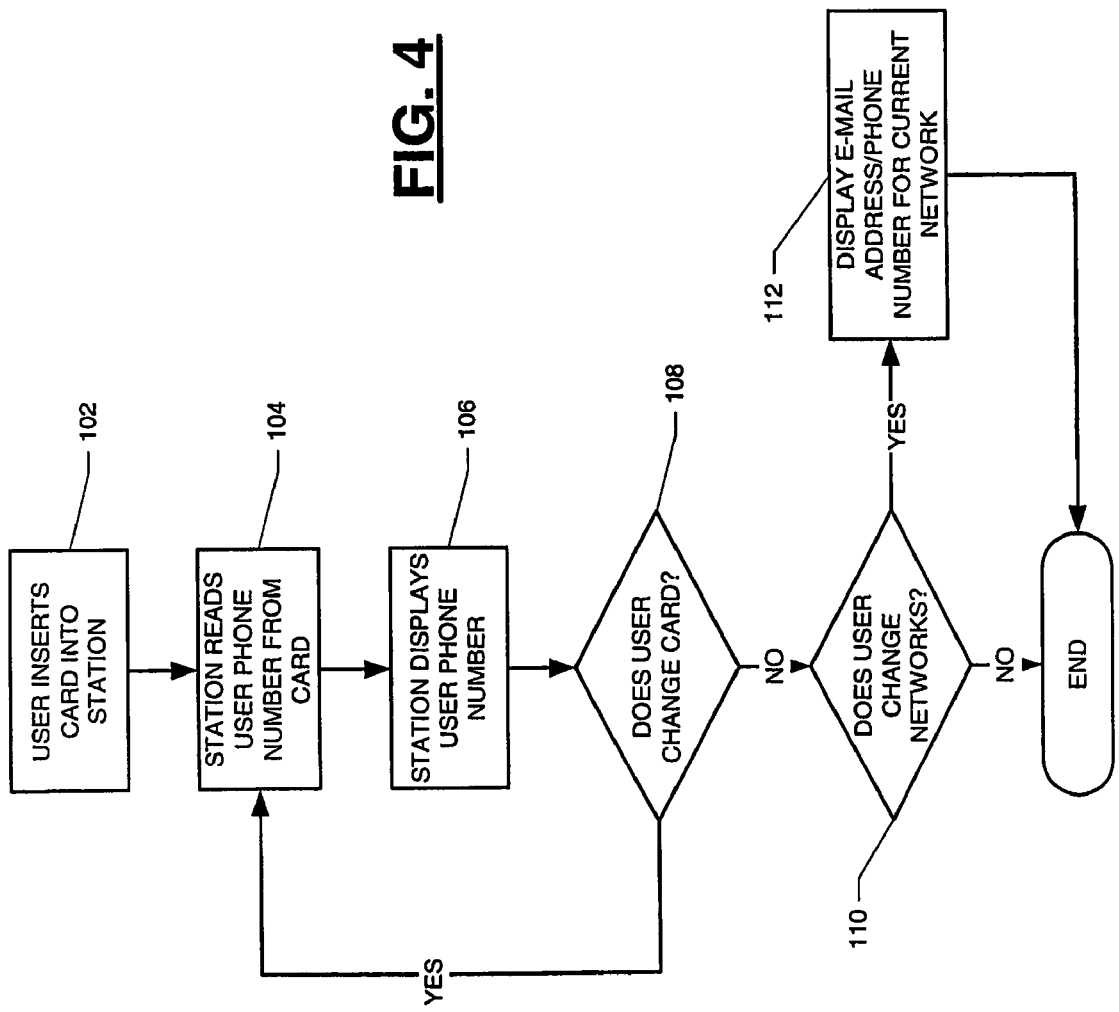
FIG. 4 is a flow chart showing steps for displaying a phone number on the main screen of a mobile station.

FIG. 4 is a flow diagram showing the steps for displaying the phone number on a main screen of the dual-mode station. In step 102, the user inserts a card into the dual-mode station. In step 104, the station reads the phone number from the card. In step 106, the station preferably displays the number it read from the card on the main screen of the station. If the user changes the card in step 108, then returning to step 104, the station will re-read the new number from the new card and in step 116 display this number on the main screen. If the user changes networks in step 110, the station will display the phone number for this new network on the main screen in step 112.

Figure 5:
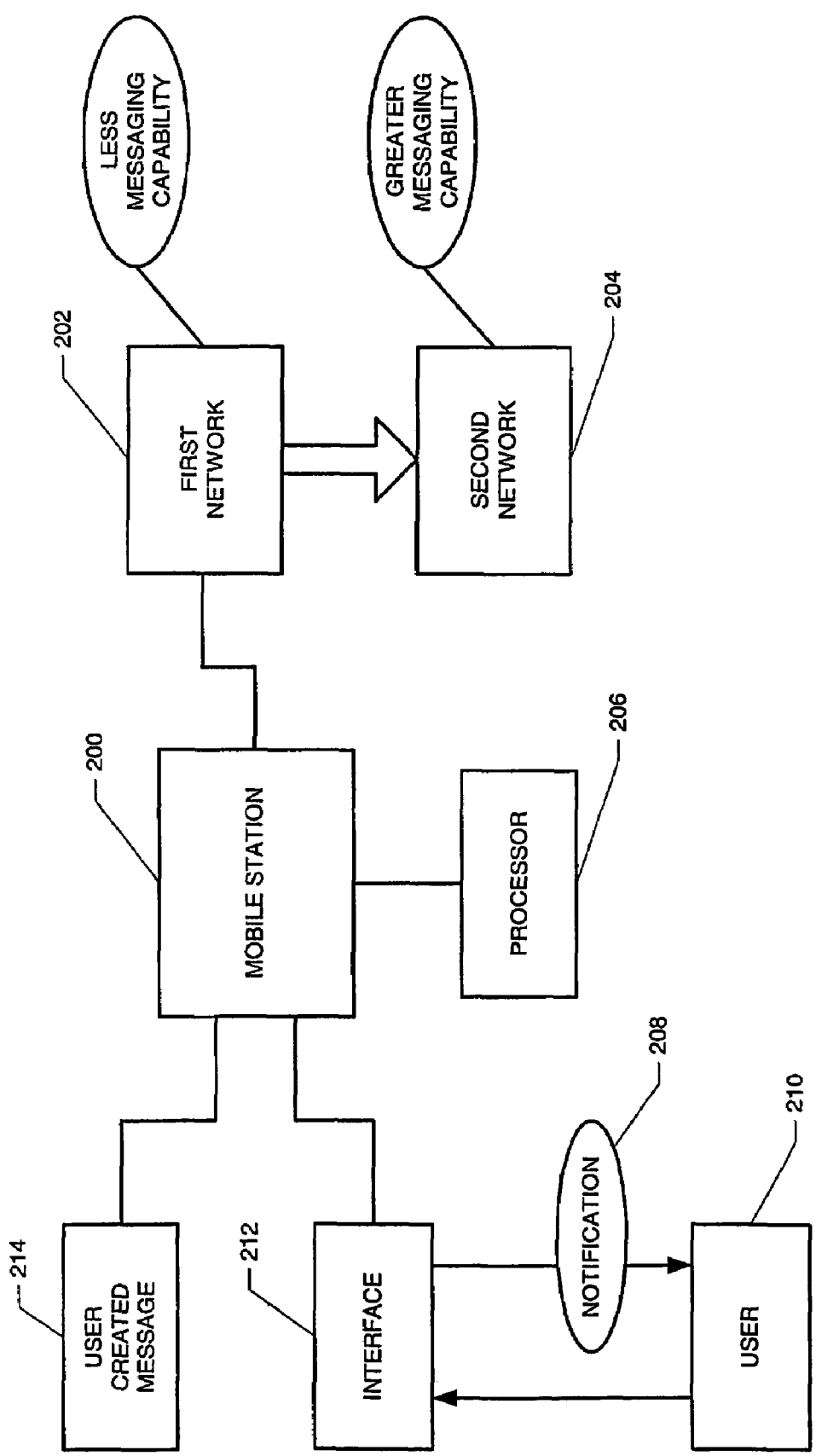
FIG. 5 is a block diagram depicting a station that has been configured to handle text messages within communication networks of varying text messaging capabilities.

FIG. 5 depicts a station 200 that has been configured to handle text messages within communication networks of varying text messaging capabilities. The varying text messaging capabilities arise from a first communication network 202 providing greater text messaging capability than a second communication network 204. For example, the Groupe Special Mobile or the Global System for Mobile Communications (GSM) network is a voice-only network that supports limited 'paging' or messaging capabilities. This limited support is known as SMS (Short Messaging Service) and supports messages of 160 characters that severely limit the amount of information that can be exchanged. To expand text messaging capability, a General Packet Radio Service (GPRS) data network is added to GSM to support larger data exchanges to a full range of wireless stations. If a user enters a country that has not yet implemented or installed the GPRS data support in their GSM network, then the user only has limited data exchange support.

It is noted that the terms GSM and GPRS are used to represent wireless networks that support both voice and data communications. In these networks two networks are merged into one single network that can support both voice and data communications over the same physical network. The relatively newest of these combined networks include: (A) the Code Division Multiple Access (CDMA) network that has been developed and operated by Qualcomm, (B) the Groupe Special Mobile or the Global System for Mobile Communications (GSM) and the General Packet Radio Service (GPRS) both developed by the standards committee of CEPT, and (C) the future third-generation (3G) networks like EDGE and UMTS. GPRS is a data overlay on top of the very popular GSM wireless network, operating in virtually every country in Europe.

FIG. 5 shows a user 210 accessing an Interface 212 (e.g., a screen or window) of the station 200 in order to create a text message 214. The station 200 determines the text messaging capability or the type of communication network within which the mobile station is presently operating. For example, the station 200 may determine that the present coverage only provides limited text messaging capability and that the text message 214 exceeds the limited text messaging capability. In such a situation, the station 200 may notify the user 210 of presence of only limited text messaging capability. The station 200 may then allow that a text message be sent that is compatible with the text messaging capability of the present coverage. The station 200 may also allow the message 214 to be stored until the station 200 enters into a network whose capability is sufficient to send the message. To perform these operations, the station 200 contains a processor 206. The station 200 also contains a storage device to store textual messages. Many different storage devices may be used, such as a station's non-volatile memory (e.g., flash memory) or volatile memory (e.g., RAM).

The station 200 may provide many different types of indications to the user, such as visual or audible indications to alert the user as to messaging data capability. The indicators may represent the size and type of messages that are supported through the current network capabilities. The indicator may also be useful for debugging problems, determining the type of messages that can be exchanged with the network, and determining which networks and network nodes support data traffic at any given point in time. For example, customer support can ask the user what the network capability indicator currently reads and can help the user understand why they cannot send messages of a certain type.

Figure 6:
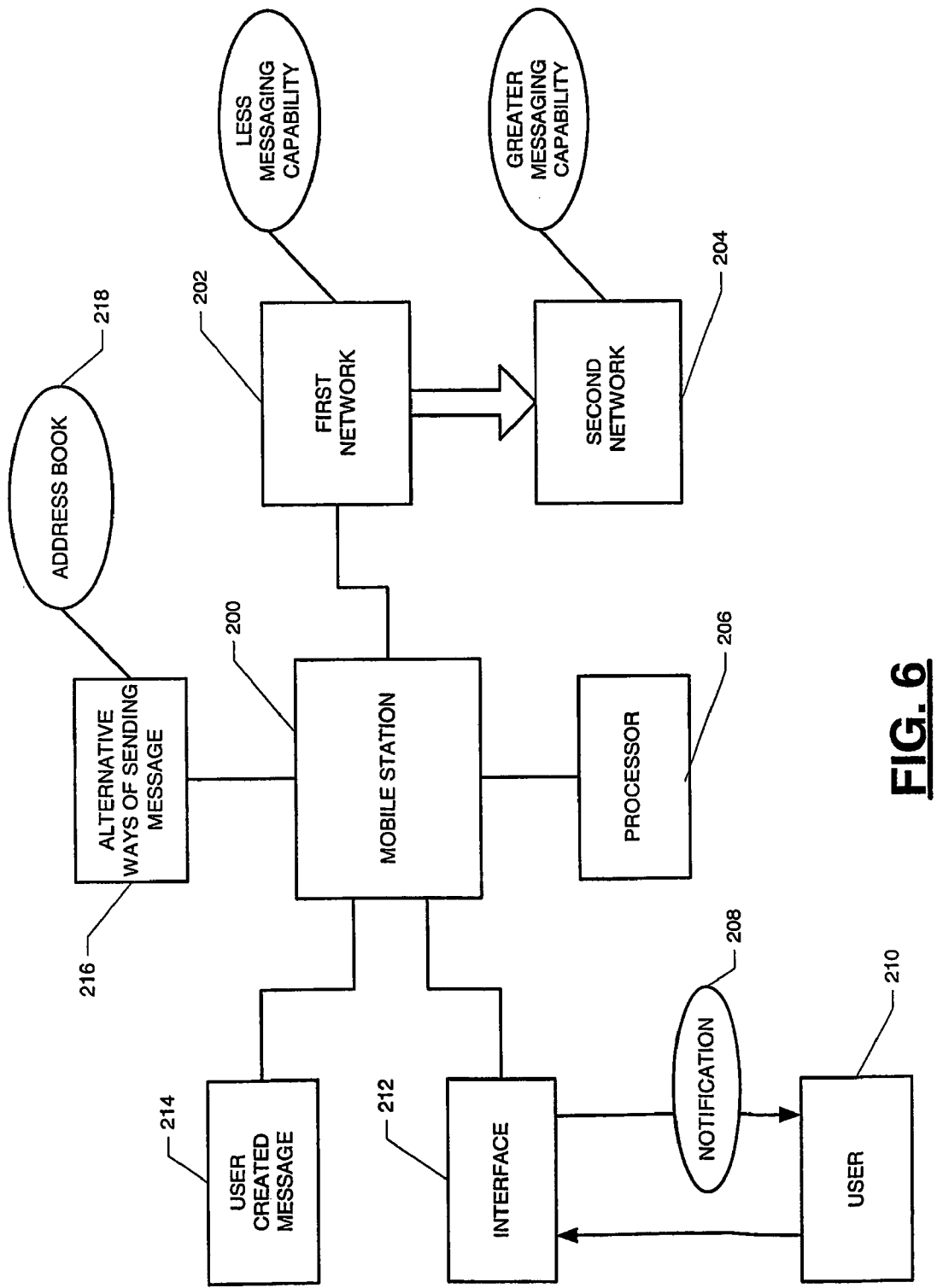
FIG. 6 is a block diagram depicting use of alternative ways of sending a message based upon type of communication network.

FIG. 6 shows still another technique that a station 200 may utilize. The station 200 may provide one or more alternative ways 216 of sending the message 214. For example, the station 200 will check to see if the recipient is in the station's address book 218. If the message's recipient is in the station's address book 218, then the station 200 will check to see if the recipient has a GSM phone number. If the recipient does have a GSM phone number, then the station 200 will alert the user 210 that they may contact the recipient using SMS and presents the user 210 with that choice via the interface 212.

As another example, the mobile station 200 may detect the presence of RF data channels on the local base station closest to the mobile device. The user is presented with a tracking indicator showing the current data capabilities of the wireless network. The user's ability to perform data operations is restricted when the network tracking indicator shows that data channels are not currently available.

It should be understood that some or all of these operations may have varying degrees of manual Interventions. As an illustration, the station 200 may be configured to have the user 210 informed that the present network lacks the capability to transmit the created text message 214, or the user 210 is informed that a recipient has a GSM phone number and that upon user approval the message 214 will be sent using SMS. Also, the station 200 could be configured to automatically perform such operations without any or substantial user involvement. It should also be understood that the station 200 may be communicating with many different types of networks. For example, a user may roam from a GSM/GPRS network to an 802.11 network, or from a Bluetooth network to a W_CDMA network, or from a 802.11 network to a GSM-only network, etc. As the user moves between these networks a network capability notification is provided the user to assist the user in understanding what capabilities are available at any given point in time.

The station 200 may also include other capabilities as a user moves between networks with different capabilities. For example, a user moving to networks like 802.11 might provide an indicator that a user is allowed now to login-in securely through the companies VPN servers. Another indicator might indicate that the user has moved to an 802.11 network which might also enable the use of voice over IP (VOIP) and help reduce the user's phone costs. An indication of accessibility to a Bluetooth network might allow the user to send a document to a locally available Bluetooth-compatible printer. Accordingly, the indicators may represent many different network capabilities, such as: GSM, GPRS, CDMA, I-DEN, W-CDMA, 802.11, GSM/802.11, GPRS/802.11, CDMA/802.11, GPRS/Blue, etc.

Figure 7:
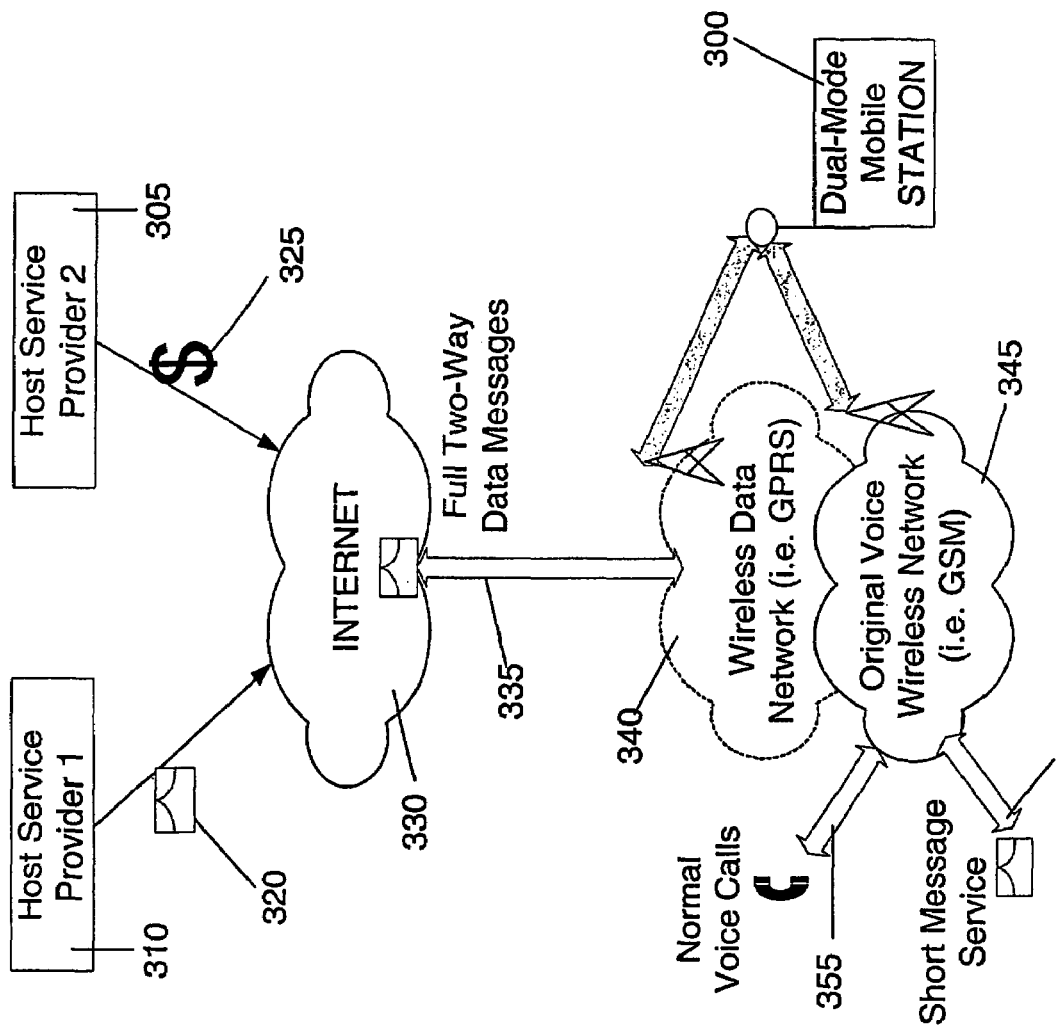
FIG. 7 is an example of an environment where the dual-mode mobile station may be used showing both the data and voice elements of the system.

FIG. 7 shows an exemplary environment where a mobile station may be used. As shown in FIG. 7, there is a dual-mode mobile station 300 capable of receiving both voice and data events simultaneously. The environment may allow the pushing of data items from a host system to a dual-mode mobile data communication station 300. Although the systems and methods described herein are not restricted solely to a push-based technique, a more detailed description of push-based messaging may be found in U.S. Pat. 6,219,694 ("the '694 Patent"), entitled "System and Method for Pushing Information From A Host System To A Mobile Data Communication Device Having A Shared Electronic Address", and issued to the assignee of the instant application on Apr. 17, 2001, and in the following co-pending and commonly-owned United States Patent Applications, all of which are related to the '694 Patent: U.S. patent applications Ser. Nos. 09/401,868, 09/545,963, 09/528,495, 09/545,962, and 09/649,755. The complete disclosure of the '694 Patent and each of these applications, including drawings and claims, is hereby incorporated into this application by reference.

Additionally there might be a range of host service providers 305 and 310 that exchange large messages with dual-mode mobile stations on a regular basis. The data being exchanged could include information like e-mail, voice-mail, intranet data, database engines, CRM data, SAP data, financial transactions, banking information and all forms of related corporate information 320 and 325. The dual-mode mobile station 300 is also capable of receiving and sending traditional cell phone calls on voice channels. This aspect of the dual-mode mobile station 300 allows it to connect with a voice-based wireless network 345, which for anyone skilled in the art understands this is a traditional cell-phone network 345. These communication methods are not mutually exclusive and both could be operating simultaneously on the same dual-mode mobile station 300.

In legacy GSM networks there was support present for both voice-based traffic 355 and SMS traffic 350. Short message service (SMS) 350 was used on the voice control channel of the GSM network and support 170 characters of data traffic to be exchanged. Host side connections to this SMS link were very difficult and expensive so very limited penetration was achieved for traditional corporate 310, financial 305 or Internet service based solutions 330. SMS was occasionally used for peer-to-peer messages to other phones and the data limitations were severe enough that GPRS was developed to solve the lack of data support.

Figure 8:
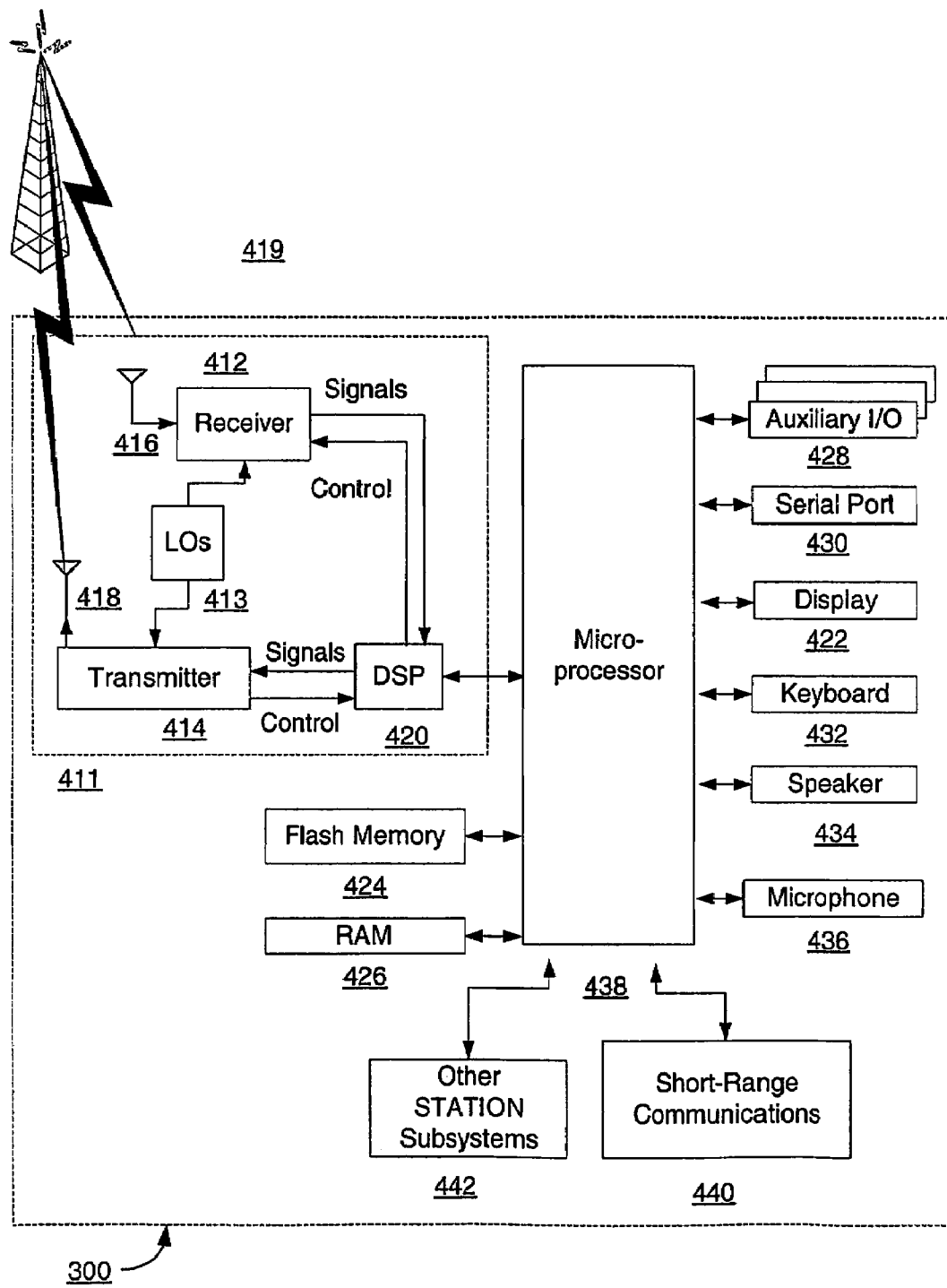
FIG. 8 is a block diagram illustrating components that may be used with a dual-mode mobile station.

FIG. 8 is a block diagram of a mobile communication station 300 in which the methods and systems described herein may be implemented. The mobile communication station 300 is preferably a two-way communication station having at least voice and data communication capabilities. The station preferably has the capability to communicate with other computer systems on the Internet. Depending on the functionality provided by the station, the station may be referred to as a data messaging station, a two-way pager, a cellular telephone with data messaging capabilities, a wireless Internet appliance or a data communication station (with or without telephony capabilities).

Where the station 300 is enabled for two-way communications, the station will incorporate a communication subsystem 411, including a receiver 412, a transmitter 414, and associated components such as one or more, preferably embedded or internal, antenna elements 416 and 418, local oscillators (LOs) 413, and a processing module such as a digital signal processor (DSP) 420. As will be apparent to those skilled in the field of communications, the particular design of the communication subsystem 411 will be dependent upon the communication network in which the station is intended to operate. For example, a mobile station 300 destined for a North American market may include a communication subsystem 411 designed to operate within the Mobitex™ mobile communication system or DataTAC™ mobile communication system, whereas a mobile station 300 intended for use in Europe may incorporate a General Packet Radio Service (GPRS) communication subsystem 411.

Network access requirements will also vary depending upon the type of network 419. For example, in the Mobitex and DataTAC networks, mobile stations such as 300 are registered on the network using a unique personal identification number or PIN associated with each station. In GPRS networks however, network access is associated with a subscriber or user of a station 300. A GPRS station therefore requires a subscriber identity module (not shown), commonly referred to as a SIM card, in order to operate on a GPRS network. Without a SIM card, a GPRS station will not be fully functional. Local or non-network communication functions (if any) may be operable, but the mobile station 300 will be unable to carry out any functions involving communications over network 419. When required network registration or activation procedures have been completed, a mobile station 300 may send and receive communication signals over the network 419. Signals received by the antenna 416 through a communication network 419 are input to the receiver 412, which may perform such common receiver functions as signal amplification, frequency down conversion, filtering, channel selection and the like, and in the example system shown in FIG. 8, analog to digital conversion. Analog to digital conversion of a received signal allows more complex communication functions such as demodulation and decoding to be performed in the DSP 420. In a similar manner, signals to be transmitted are processed, including modulation and encoding for example, by the DSP 420 and input to the transmitter 414 for digital to analog conversion, frequency up conversion, filtering, amplification and transmission over the communication network 419 via the antenna 418.

The DSP 420 not only processes communication signals, but also provides for receiver and transmitter control. For example, the gains applied to communication signals in the receiver 412 and transmitter 414 may be adaptively controlled through automatic gain control algorithms implemented in the DSP 420.

The mobile station 300 preferably includes a microprocessor 438 which controls the overall operation of the station. Communication functions, including at least data and voice communications, are performed through the communication subsystem 411. The microprocessor 438 also interacts with further station subsystems such as the display 422, flash memory 424, random access memory (RAM) 426, auxiliary input/output (I/O) subsystems 428, serial port 430, keyboard 432, speaker 434, microphone 436, a short-range communications subsystem 440 and any other station subsystems generally designated as 442.

Some of the subsystems shown in FIG. 8 perform communication-related functions, whereas other subsystems may provide "resident" or on-station functions. Notably, some subsystems, such as keyboard 432 and display 422 for example, may be used for both communication-related functions, such as entering a text message for transmission over a communication network, and station-resident functions such as a calculator or task list.

Operating system software used by the microprocessor 438 is preferably stored in a persistent store such as flash memory 424, which may instead be a read only memory (ROM) or similar storage element (not shown). Those skilled in the art will appreciate that the operating system, specific station applications, or parts thereof, may be temporarily loaded into a volatile store such as RAM 426. It is contemplated that received communication signals may also be stored to RAM 426.

The microprocessor 438, in addition to its operating system functions, preferably enables execution of software applications on the station. A predetermined set of applications which control basic station operations, including at least data and voice communication applications for example, will normally be installed on the mobile station 300 during manufacture. A preferred application that may be loaded onto the station may be a personal information manager (PIM) application having the ability to organize and manage data items relating to the station user such as, but not limited to e-mail, calendar events, voice mails, appointments, and task items. Naturally, one or more memory stores would be available on the station to facilitate storage of PIM data items on the station. Such PIM applications would preferably have the ability to send and receive data items, via the wireless network. In a preferred embodiment, the PIM data items are seamlessly integrated, synchronized and updated, via the wireless network, with the station user's corresponding data items stored or associated with a host computer system. Further applications may also be loaded onto the mobile station 300 through the network 419, an auxiliary I/O subsystem 428, serial port 430, short-range communications subsystem 440 or any other suitable subsystem 442, and installed by a user in the RAM 426 or preferably a non-volatile store (not shown) for execution by the microprocessor 438. Such flexibility in application installation increases the functionality of the station and may provide enhanced on-station functions, communication-related functions, or both. For example, secure communication applications may enable electronic commerce functions and other such financial transactions to be performed using the mobile station 300.

In a data communication mode, a received signal such as a text message or web page download will be processed by the communication subsystem 411 and Input to the microprocessor 438, which will preferably further process the received signal for output to the display 422, or alternatively to an auxiliary I/O station 428. A user of mobile station 300 may also compose data items such as email messages for example, using the keyboard 432, which is preferably a complete alphanumeric keyboard or telephone-type keypad, in conjunction with the display 422 and possibly an auxiliary I/O station 428. Such composed items may then be transmitted over a communication network through the communication subsystem 411.

For voice communications, overall operation of the mobile station 300 is substantially similar, except that received signals would preferably be output to a speaker 434 and signals for transmission would be generated by a microphone 436. Alternative voice or audio I/O subsystems such as a voice message recording subsystem may also be implemented on the mobile station 300. Although voice or audio signal output is preferably accomplished primarily through the speaker 434, the display 422 may also be used to provide an indication of the identity of a calling party, the duration of a voice call, or other voice call related information for example.

The serial port 430 may be implemented in a personal digital assistant (PDA)-type communication station for which synchronization with a user's desktop computer (not shown) may be desirable, but is an optional station component. Such a port 430 would enable a user to set preferences through an external station or software application and would extend the capabilities of the station by providing for information or software downloads to the mobile station 300 other than through a wireless communication network. The alternate download path may for example be used to load an encryption key onto the station through a direct and thus reliable and trusted connection to thereby enable secure station communication.

A short-range communications subsystem 440 is a further optional component which may provide for communication between the station 424 and different systems or stations, which need not necessarily be similar stations. For example, the subsystem 440 may include an infrared station and associated circuits and components or a Bluetooth™ communication module to provide for communication with similarly-enabled systems and stations.

Figure 9:
FIG. 9 shows a main screen of a dual-mode mobile station showing only voice coverage.

FIG. 9 presents as an example of a handheld PDA station that is capable of RF communications. This PDA is produced by Research In Motion and is capable of both voice and data communications simultaneously. As shown at 505 the current indicator on the main screen shows GSM traffic only. With this indicator the user will be capable of sending and receiving voice calls and sending or receiving SMS messages, if the user tries to compose and send a full e-mail message, access a corporate database or browse the Internet, they will be informed that this support is not possible at this time. Internet access includes, but is not limited to access of HTML, WML, XMS, cHTML, XHTML web page content. However, if the user checks the main screen they will not waste time in trying to use these services as they can determine quickly before hand it would be not accessible.

Figure 10:
FIG. 10 shows a main screen of a dual-mode mobile station showing both voice and data coverage.

FIG. 10 shows the same handheld PDA station as FIG. 9, except that indicator 605 indicates that GPRS support is now present. When a person is using such a station they are able to quickly and easily determine the capability of a given network base station, sub-network or network. For one skilled in the art of wireless communications it is common for networks to limit one or more base stations to restrict access to capabilities like GPRS. For example it would be possible that when traveling between Great Britain and France that GPRS support could be lost, as France might not have implemented GPRS in their network. The unsuspecting user could be very frustrated and even return the mobile station 300 if it failed to work as advertised. The GPRS indicator informs the user what the capabilities of the network are as they change countries or within the same country. The presence of this indicator helps to ensure the user understands what the capabilities of the network are, and hence what capabilities can be extended to the user at any moment in time. This indicator may be implemented using a wide range of visual changes. The user interface (UI) used may have changed the clock to bold, or a '+' sign could have been used beside the GSM indicator, or many other clues to the user. However, these UI changes are designed to Inform that user about the capabilities available to them within the station, as extended by the wireless network.

Figure 11:
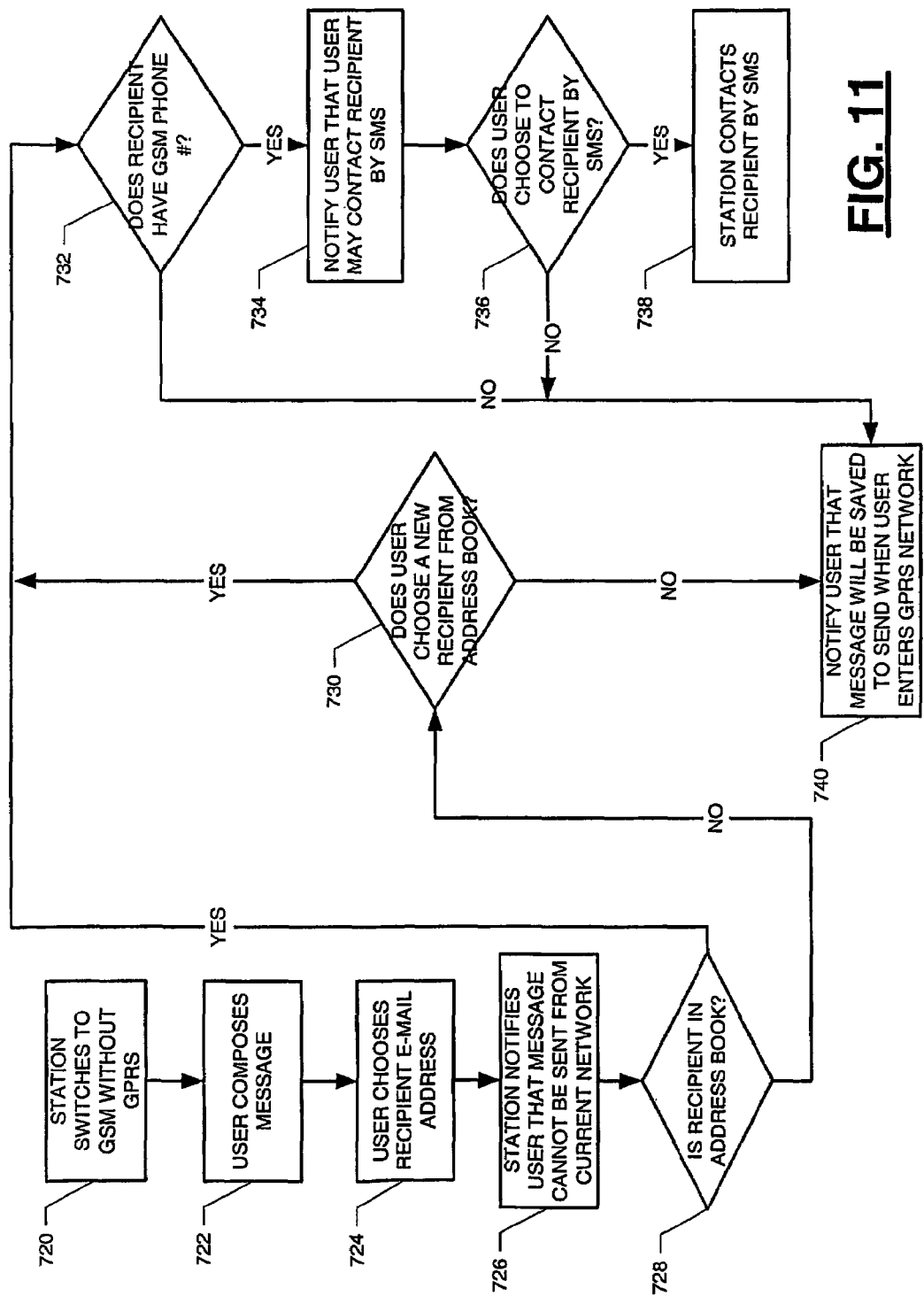
FIG. 11 is a flow chart showing the steps for sending a message when a user enters a GSM network without GPRS.

FIG. 11 describes an exemplary scenario involving these operations as well as others. More specifically, FIG. 11 illustrates a scenario for sending a message when a user enters a GSM network without GPRS. In this scenario the mobile station automatically detects the network capability and informs the user during the process of composing a message. In step 720, the user enters a GSM network that does not support GPRS. The user then composes an e-mail message in step 722 either replying to a large message or composing a large message to send to an e-mail address. However, since the user is not in a GPRS-supported network, when the user enters the recipient e-mail address in step 724, the station will alert the user that the message cannot be sent on the current network in step 726. The station will then check to see if the recipient is in the station's address book in step 728. Note, that it is possible the destination e-mail address was entered as a one-time address and the recipient is not in the address book. If the recipient is not in the address book, then in step 730, the user is given the option of entering the address book to select a recipient that does have an SMS address. In step 740, if the user decides not to enter the address book and selects another recipient, the station will alert the user that the message will be saved and sent when the user enters a network that supports GPRS. If the recipient is in the station's address book, or if the user decided to enter the address book, then in step 732 the station will check to see if the new recipient has GSM phone number. If the recipient does not have a GSM phone number, then in step 740, the station will alert the user that the message will be saved and sent when the user enters a network that supports GPRS. If the recipient does have a GSM phone number, then in step 734, the station will alert the user that they may contact the recipient using SMS and presents the user with that choice in step 736. If the user does not choose to contact the recipient using SMS, then in step 740, the station will alert the user that the message will be saved and sent when the user enters a network that supports GPRS. If the user does choose to contact the recipient using SMS, then in step 738, the station contacts the recipient using the GSM phone number of the recipient and initiates an SMS connection. Operations of the system are not limited to the steps or the order of the steps shown in the flow chart of FIG. 11. For example the determination of the message type supported may have occurred manually as the user examined the visual indicator. The user may also have just been allowed to compose a message type and it may have automatically been saved if it could not be sent.

Figure 12:
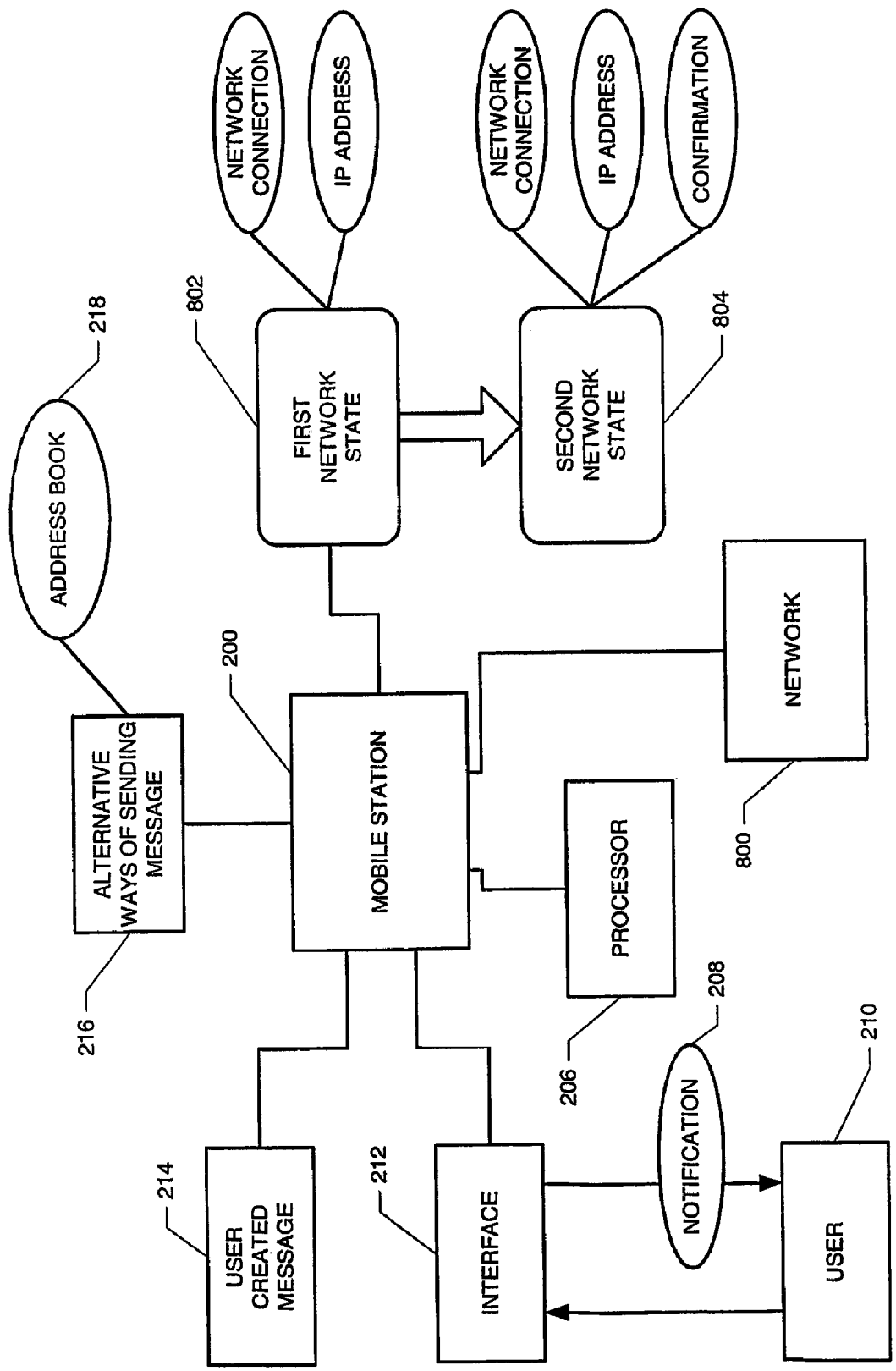
FIG. 12 is a block diagram depicting the handling of messages involving different network operational states.

It should be understood that the system may be varied in many ways. As shown in the example of FIG. 12, the mobile station 200 may handle its sending of text messages differently based upon where in the network registration process the station is. The station 200 may have been able to connect to a GPRS network 800 and have an IP (internet protocol) address. However, the station 200 has not completed the registration process with the network 800. In such a situation, the station's network connection status is considered to be in a state 802 less than full GPRS capability. When the station is in a state 802 less than full GPRS capability, the station 200 handles the transmission of text messages differently, such as by handling the message as if the station were in a GSM network (with only SMS capability). After the station 200 receives confirmation from the network 800, then the station is considered to be in a state 804 with full GPRS capability. Text message handling by the station 200 is performed as described above.

In those situations where capability is overlapping, then the station may automatically determine the best most cost effective method to perform the action. For example, it a user roamed from GPRS to 802.11 the user will be notified that they can compose large messages. In this example, the station routes these messages directly to the 802.11 node and not the GPRS node to save network costs. Alternative, the user might configure the device to prompt them with the choice, just in case it is important that the message be sent through the slower and more expensive GPRS. (This might arise because the host service being accessed is only available through this path). Also if the user roams from GSM to 802.11 coverage, the user could make a phone call through either network GSM or 802.11. The user can configure automatic or manual behaviour to determine a method for routing the call. Once they see the GSM/802.11 indicator they know that calls are supported, however they may be prompted to determine if they want to make a traditional GSM call or an advanced voice over IP (VOIP) 802.11-based call. In this embodiment the network capability indicator might show both networks that can be used, for example GSM/802.11, GPRS/802.11, CDMA/Bluetooth or UMTS/802.11. This extended visual indicator further assists the user to understand the options available for them on each available network.

Figure 13:
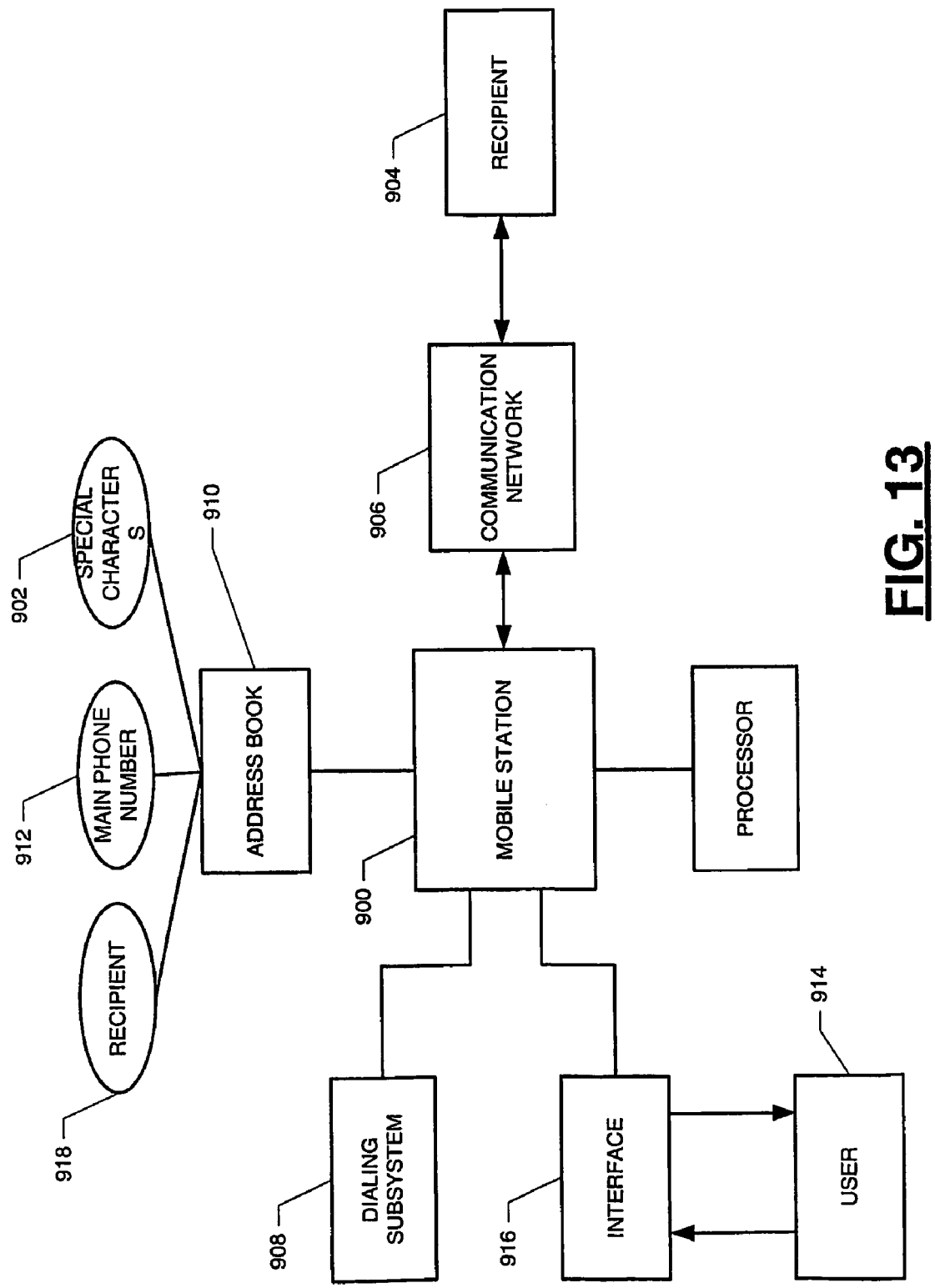
FIG. 13 is a block diagram depicting a system which allows a station to handle special characters such as extension numbers when dialling to reach a recipient over a communication network.

FIG. 13 shows a system wherein a station 900 can handle special characters 902 such as extension numbers when calling a recipient 904 over a communication network 906. The station 900 includes a dialling subsystem 908 that dials a main phone number 912 and any extension 902 found in an address book 910. Such an approach obviates the need for the user 914 to re-open an address book application 910 in order to find the associated extension number to input manually. Optionally, the station 900 may ask the user 914 via the station's interface 916 whether to dial the extension number 902 before an attempt is made to dial the extension number 902. Otherwise the operation may be performed automatically.

Figure 14A:
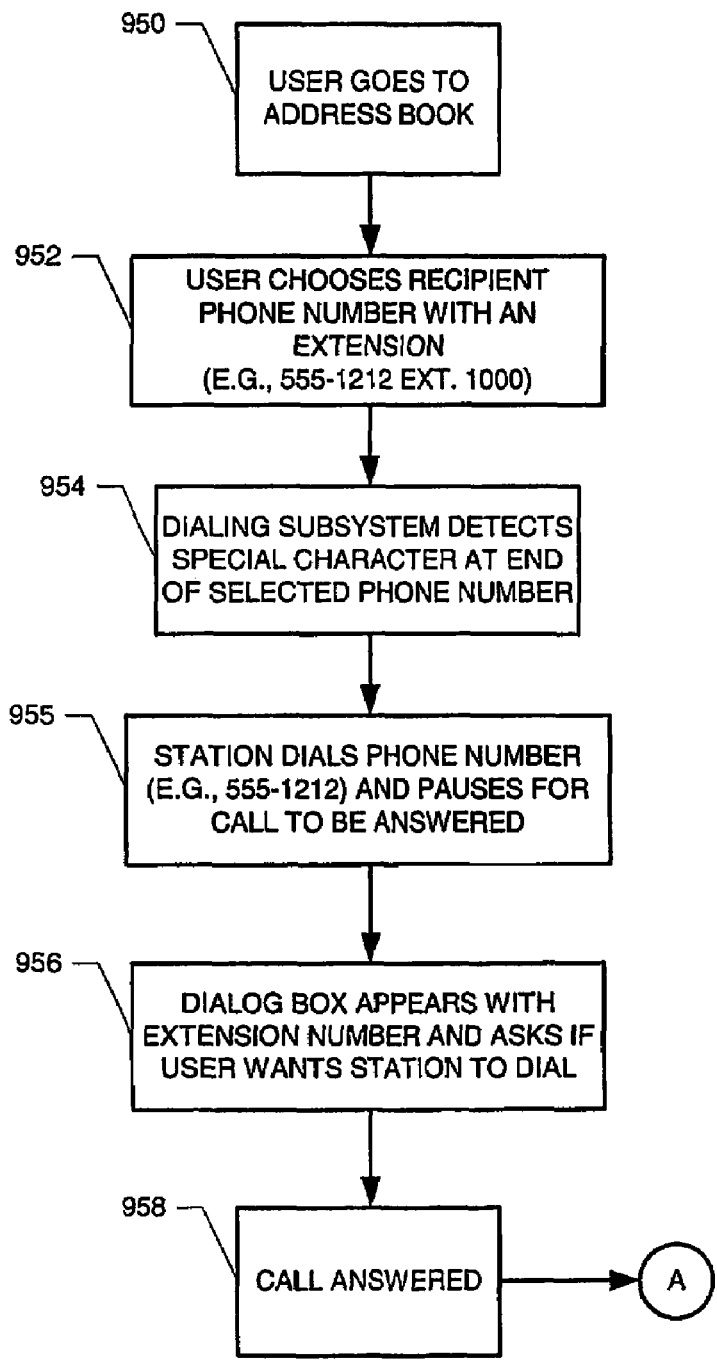
FIGS. 14A and 14B are flow charts showing steps for making a phone call using a phone number that has an associated extension number.
Figure 14B:
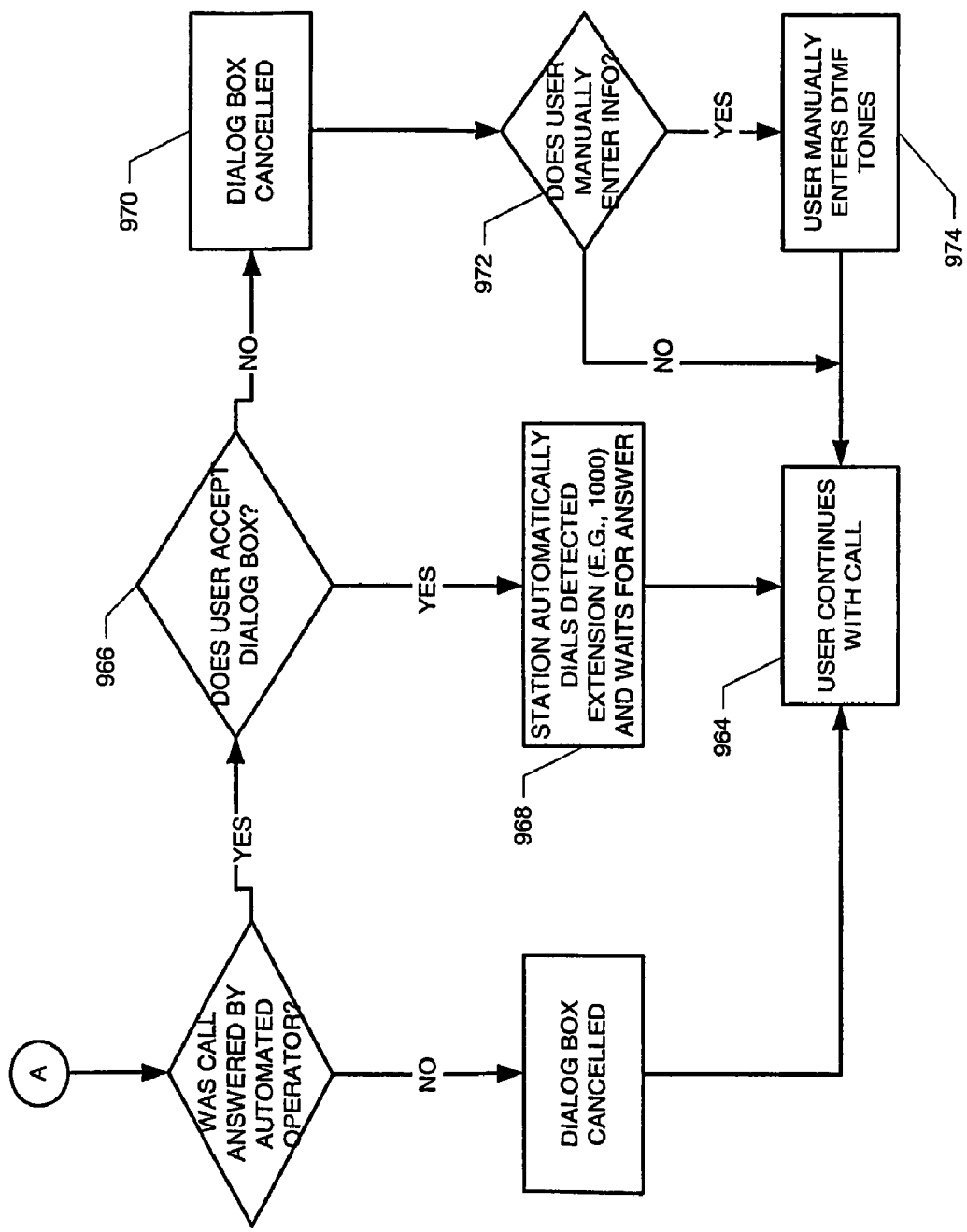

FIGS. 14A and 14B illustrate a scenario for making a voice call using a phone number that has an associated extension number. In order to recognize associated extensions, the station preferably recognizes special characters in the address book that are related to extension numbers. Extension numbers may be prefixed at the user's discretion and may use such characters as 'x.', 'x', 'ext.', 'ext', 'ex.', 'ex', 'e.', 'e', or 'extension'.

In step 950, the user enters the station's address book application. The user chooses to call a recipient phone number that has an extension number in step 952, for example, 555-1212 ext. 1000. In step 954, the station's dialling subsystem detects a special character at the end of the selected phone number. In step 955, when the station dials the phone number, the station preferably pauses in order to wait for the call to be answered. In step 956, a dialog box appears on the station screen to ask whether the user wants the station to dial the detected extension number. In step 958, the call is answered. In step 960, it is determined if the call was answered by an automated operator. If the call was not answered by an automated operator, then in step 962, the dialog box is cancelled, and the user continues with the phone call in step 964.

If the call is answered by an automated operator, in step 960, then the user decides whether to accept the dialog box and dial the extension number in step 966. If the user accepts the dialog box, then in step 968, the station automatically dials the extension number provided in the address book and waits for the call to be answered. The user then continues with the call in step 964.

If the user does not accept the dialog box in step 966, then the dialog box is automatically cancelled in step 970. In step 972, the station allows the user to manually enter the necessary information for the automated operator. If the user chooses not to enter any information, as some automated operators allow, the user will continue with the call in step 964. If the user chooses to enter information, then the user will enter the Dual Tone Multiple Frequency tones for the automated operator to process and respond to in step 974. The user will then continue with the call in step 964.

The system and method may be varied in many ways. For example, the device may have the ability to dial an extension with no main phone number included. The user may have stored the company phone number within a phone application. If the dialling software encounters a number with only the special extension string, then it dials the company number first, pauses for a configured length of time and then dials the extension.

Figure 15:
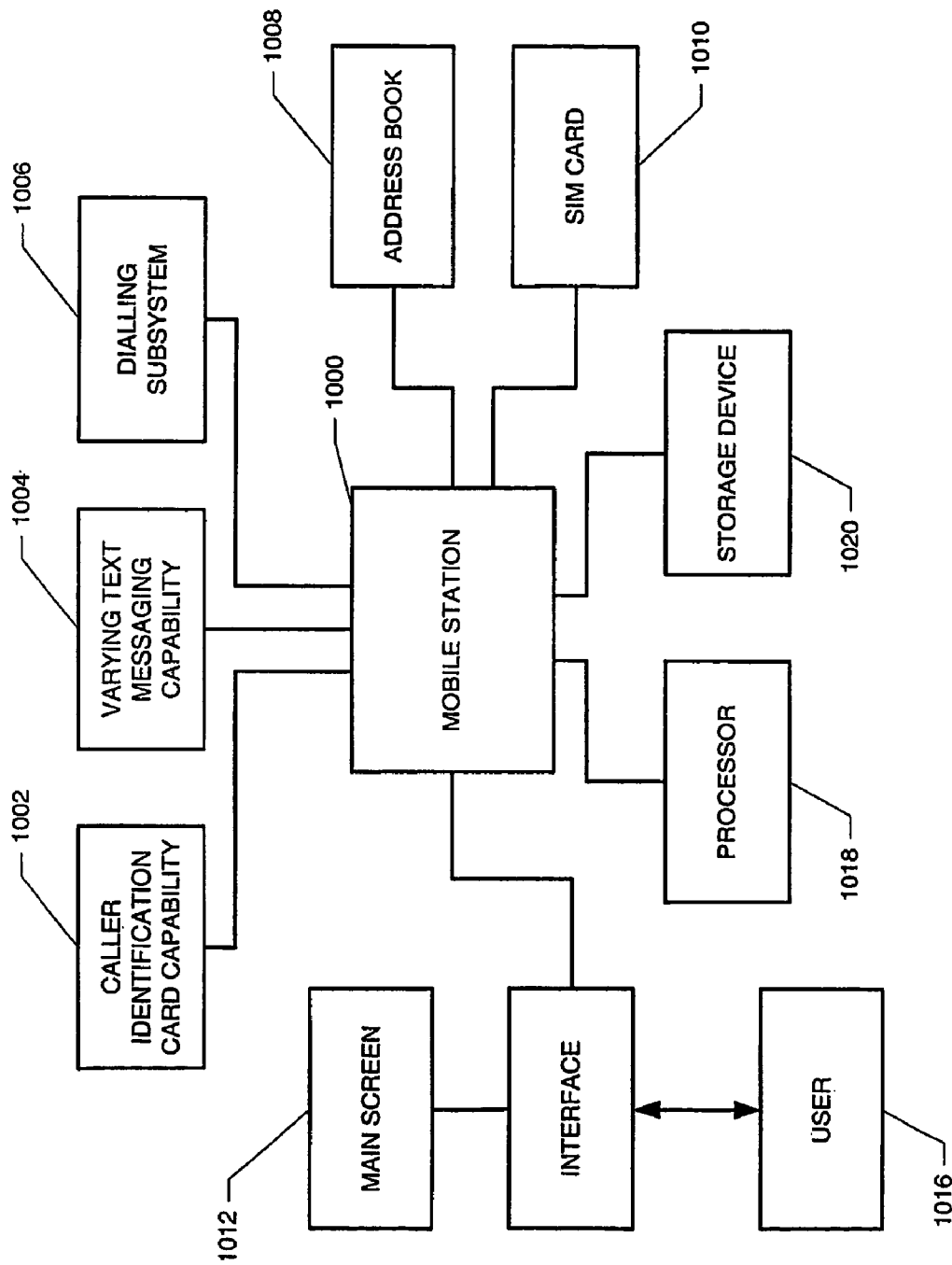
FIG. 15 is a block diagram depicting a mobile station capable of caller identification card processing, varying text messaging processing, and phone extension dialling processing.

Still further, it will be appreciated that the entire above description relates to the preferred embodiment(s) by way of example only. Many variations on the systems and methods will be obvious to those knowledgeable in the field, and such obvious variations are within the scope of the systems and methods as described and claimed, whether or not expressly described. For example, FIG. 15 shows a mobile station 1000 capable of caller identification card processing 1002, processing 1004 to handle communication networks of varying text messaging capabilities, and phone extension dialling processing 1006. Such processing (1002, 1004, and 1006) which were described above enhances the ease of use of the mobile station 1000 for a user 1008. In the example of FIG. 15, the mobile station 1000 includes a processor 1018 having a data pathway to a subscriber identity module (SIM) card 1010. The SIM card 1010 is associated with one or more preselected phone numbers. The processor 1008 is configurable to execute machine instructions that allow the phone number(s) associated with the card 1016 to be displayed on the mobile station's main screen 1012.

The mobile station 1000 also includes in this example a station interface 1014 that facilitates creation of a text message through interaction with the station's user 1016. The processor 1018 provides a determination of text messaging capability of the communication network within which the mobile station 1000 is operating. A storage device 1020 stores the user's text message. The user's text message is sent from the station 1000 when the station 1000 is within a communication network whose text messaging capability is sufficient to handle the user's text message or is handled by some alternate processing as described above. Moreover, the station 1000 may include an address book application 1008 which contains recipients' main phone numbers and extensions. The station's user 1016 accesses the address book application 1008 in order to request that a recipient be contacted. The dialling subsystem 1006 uses the main phone number and extension from the address book application 1008 to contact the requested recipient.

The invention claimed is:

1. A method of displaying network capabilities within a wireless network, comprising the steps of:
   detecting by a mobile station that the mobile station has voice-only or voice and data support on a base station within a network;
   providing a first visual indicator to a mobile station's user when voice-only or voice and data support is present within the network based on detected current network capability;
   wherein the first visual indicator is a network-level indication in that the first visual indicator indicates which radio standard is accessible to the mobile station;
   detecting by the mobile station via the base station, when the network is capable of supporting greater data communications based on detected current network capability, and
   providing a second visual indicator to the mobile station's user when greater data exchanges are available through the mobile station;
   wherein the second visual indicator is a network-level indication in that the second visual indicator indicates that a second radio standard is accessible to the mobile station and indicates which radio standard is accessible to the mobile station.

2. The method of claim 1 where the wireless network is a GSM wireless network with optional GPRS data overlay support;
   wherein the first indicator is a textual GSM indication that the mobile station is within a GSM wireless network;
   wherein the second indictor is a textual GPRS indication that the mobile station is within the optional GPRS data overlay support wireless network.

3. The method according to one of the claims 1 or 2, where the mobile station is a dual-mode PDA handheld device capable of exchanging large data messages and supporting HTML data exchanges with Internet web sites.

4. The method according to one of the claims 1 to 2, wherein the station is a dual-mode mobile station that is capable of both voice and data communications.

5. The method according to one of the claims 1 to 2, wherein the mobile station has access to capabilities of multiple networks, said method further comprising the step of: automatically determining which network to use to perform a communication operation based upon cost effectiveness consideration.

6. A method for displaying capability of a current network connection on a mobile station that is capable of roaming between networks of varying capability, comprising the steps of, accessing a network using network access methods available through the mobile station; determining the text messaging capabilities available to a mobile station's user based on the network access method used to connect the mobile station to the wireless network and a detected current network capability; and displaying on a main screen of the mobile station a representation of the determined text messaging capability to the mobile station's user; wherein the representation indicates which radio standard is accessible to the mobile station related to the determined text messaging capability.

7. The method of claim 6, wherein the network is accessed using network access methods built into the mobile station.

8. The method according to one of the claims 6 or 7, wherein the representation of the determined text messaging capability is a network capability indicator, wherein the network capability indicator indicates the text messaging capability of a single network.

9. The method according to one of the claims 6 to 7, wherein the representation of the determined text messaging capability is a network capability indicator, wherein the network capability indicator indicates the text messaging capability of at least two networks to which the mobile station currently has access.

* * * * *

UNITED STATES PATENT AND TRADEMARK OFFICE
CERTIFICATE OF CORRECTION

PATENT NO. : 7,664,515 B2
APPLICATION NO. : 10/497803
DATED : February 16, 2010
INVENTOR(S) : Lazaridis et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 454 days.

Signed and Sealed this

Twenty-eighth Day of December, 2010

David J. Kappos
*Director of the United States Patent and Trademark Office*